United States Patent [19]
Hazenbroek

[11] Patent Number: 5,344,360
[45] Date of Patent: Sep. 6, 1994

[54] METHOD AND APPARATUS FOR TRANSFERRING A BIRD FROM ONE CONVEYOR SYSTEM TO ANOTHER

[76] Inventor: Jacobus E. Hazenbroek, Burg de Zeeuwstraat 52, Numansdrop, Holland, Netherlands

[21] Appl. No.: 949,400

[22] Filed: Sep. 22, 1992

[51] Int. Cl.⁵ ............................................. A22C 21/00
[52] U.S. Cl. ................................. 452/182; 452/178; 452/183
[58] Field of Search ............... 452/182, 183, 177, 178, 452/179

[56] References Cited

U.S. PATENT DOCUMENTS

| | | | |
|---|---|---|---|
| 4,574,428 | 3/1986 | Meyn | 452/182 |
| 4,791,704 | 12/1988 | Chapman | 452/182 |
| 4,813,101 | 3/1989 | Brakels et al. | 452/182 |

FOREIGN PATENT DOCUMENTS

| | | | |
|---|---|---|---|
| 0357843 | 3/1990 | European Pat. Off. | 452/182 |
| 0231981 | 1/1986 | Fed. Rep. of Germany | 452/182 |

Primary Examiner—Willis Little
Attorney, Agent, or Firm—Hopkins & Thomas

[57] ABSTRACT

An apparatus for transferring birds from the evicerator line (11) to the cooling line (12) of a poultry processing plant, the apparatus comprising a bird removal assembly 29 having a plurality of cam operated modules (35) for lifting the birds from their shackles (18) as the modules are rotated in unison with the shackles carried by the evicerator line. The cam operated modules include a bird lifting plate (91) that is moved vertically to lift a bird from its shackle and is rotated downwardly into a horizontal position, whereat the hocks of the bird are guided from the bird lifting plate to an intermediate transfer wheel (31). The intermediate transfer wheel carries the birds over to the cooling line, whereat the hocks of the birds are then guiding into the cooling line shackles (53).

10 Claims, 8 Drawing Sheets

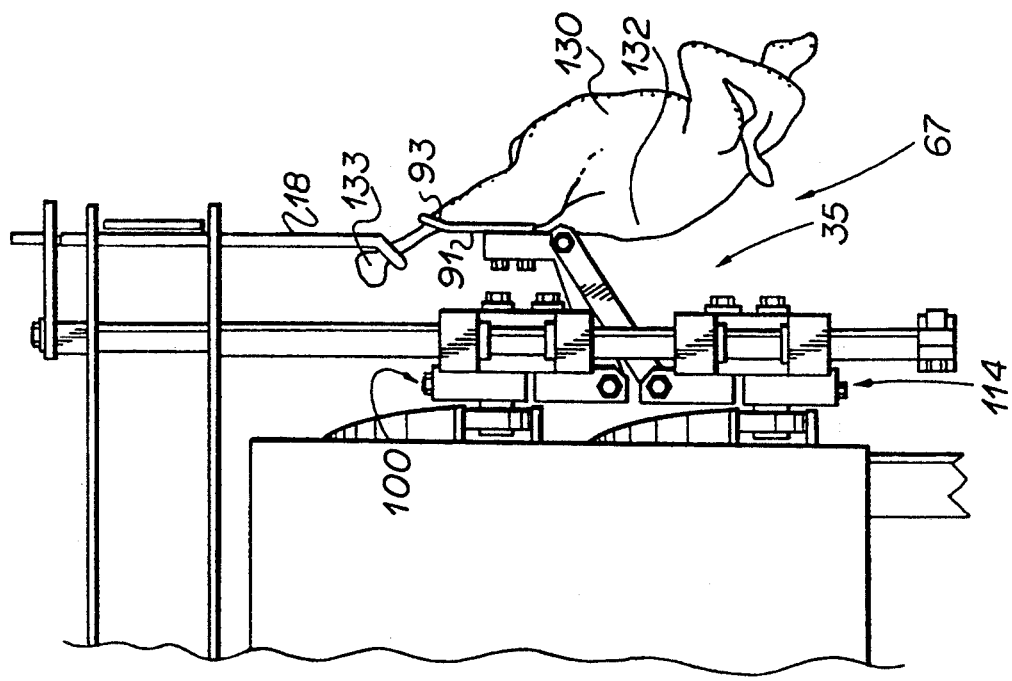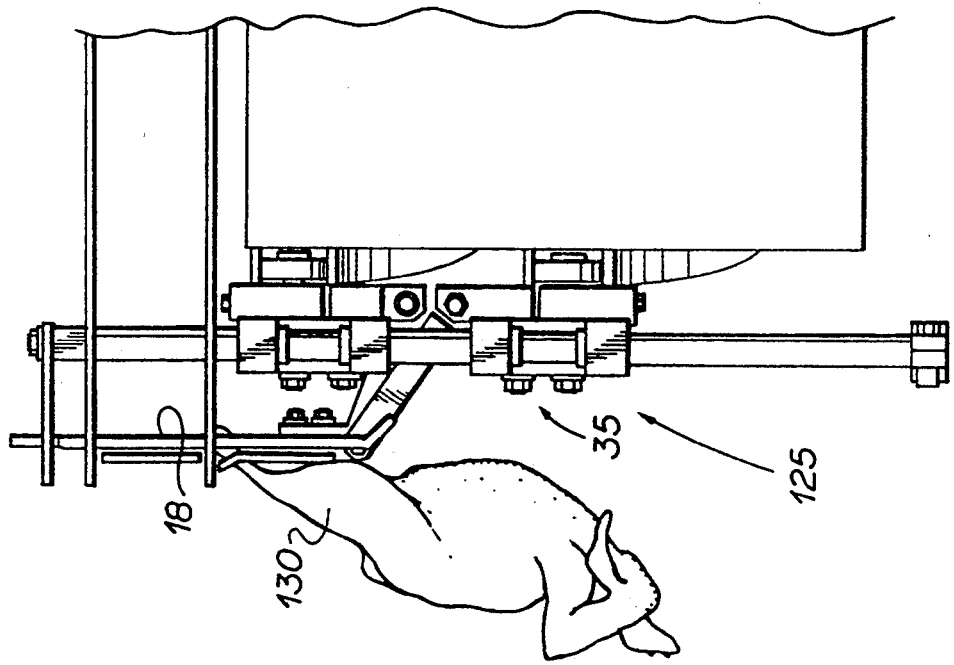
FIG 9

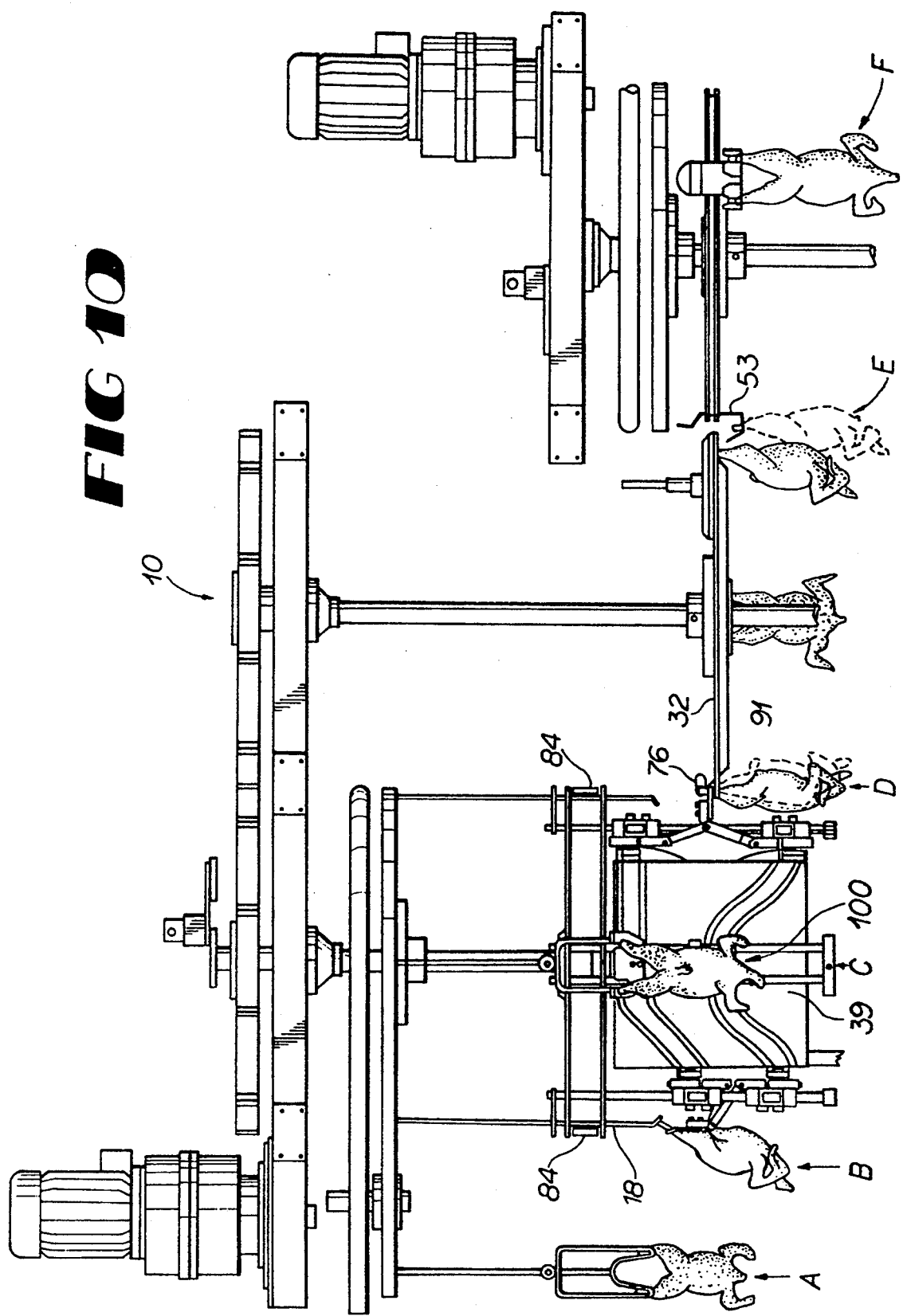

METHOD AND APPARATUS FOR TRANSFERRING A BIRD FROM ONE CONVEYOR SYSTEM TO ANOTHER

FIELD OF THE INVENTION

This invention relates in general to poultry conveying equipment in which birds are suspended by their legs and moved in series on a suspended conveyor system through a plurality of work stations. More particularly, the invention comprises a method and apparatus for automatically transferring birds from one suspended conveyor system to another suspended conveyor system.

BACKGROUND OF THE INVENTION

In the processing of chickens, turkeys, and other types of birds through a poultry processing plant for defeathering, evisceration, cut-up and packaging for delivery to a retail grocery store, etc., it is desirable to perform as many of the processing steps as possible with automated machinery. It is important to minimize the manual handling of the birds so as to minimize the expense of processing, as well as to ensure uniform processing of the birds.

The general trend in poultry processing in recent years has been to suspend birds by their legs from an overhead conveyor system and perform as many of the processing steps as possible as the birds are being moved in series on the conveyor system from one processing station to the next. For example, the birds can be decapitated, opened and eviscerated while being progressively advanced along a single overhead conveyor system. However, at certain points in the conveyor system, it is desirable to transfer the birds from one conveyor line to another. For example, after the birds have been eviscerated, it is necessary to transfer the birds from the evisceration conveyor line to a cooling line where the birds are chilled within a cooling chamber for health considerations. The cooling line typically utilizes different types of shackles from those of the evisceration line due to size constraints in the cooling chamber, thus necessitating the need to transfer the birds from one conveyor line to another.

In the past, the transfer of birds from one conveyor line to another was manually performed by an operator removing the birds from the shackles of the evisceration line and placing the legs of the birds into the shackles of the cooling line. More recently, equipment has been developed for automating this transfer process. However, these machines are complicated and do not provide a simple and efficient means for transferring the birds.

Accordingly, a need exists for an improved apparatus and method for automatically transferring birds from one overhead conveyor system to another overhead conveyor system.

SUMMARY OF THE INVENTION

Briefly described, the present invention comprises a bird transfer apparatus positioned at the end of a first overhead conveyor system and at the beginning of a second overhead conveyor system. While the present invention is herein described with reference to the eviscerator conveyor system and the cooling conveyor system, it will be understood by those skilled in the art that the present invention can be utilized for transferring birds between other overhead conveyor systems wherein both conveyor systems carry the birds in an inverted attitude suspended by their legs.

The bird transfer apparatus includes a bird removal assembly positioned at the end of the eviscerator conveyor line for removing the birds therefrom. The bird removal assembly includes a stationary cam drum and a cam operated support frame rotatable about the cam drum. A plurality of cam operated modules are supported by the cam operated support frame about the cam drum and each module includes a bird lifting plate, which has a pair of spaced recesses, movable upwardly into engagement with the birds so that the legs of each bird are captured within the recesses of the lifting plate and the birds are lifted from their shackles as the modules are revolved in timed relationship and in response to the movement of the overhead conveyor system. The cam operated support frame and cam tracks of the cam drum also tilt each bird lifting plate to a horizontal position after it has lifted the bird from its shackle in order to allow the bird to be transferred laterally out of the recesses of the bird lifting plate to an intermediate transfer wheel. The intermediate transfer wheel is positioned between the bird removal assembly and the cooling line in order to receive the birds from the bird lifting plates and carry them over to the shackles of the cooling line. The intermediate transfer wheel has corresponding pairs of spaced recesses located along its periphery for receiving and supporting the legs of the birds. The intermediate wheel is rotated horizontally in timed relationship with the movement of the cam operated modules of the bird removal assembly in order to ensure alignment of its recesses with the recesses of the bird lifting plates when the bird lifting plates are in the horizontal position. With the recesses so aligned, the birds can be easily transferred from the bird lifting plates to the intermediate wheel.

A transfer guide bar is securely mounted at the point of alignment of the recesses of the bird lifting plate and the recesses of the intermediate transfer wheel. The transfer guide bar engages the legs of the birds as the recesses of the bird lifting plate and the intermediate transfer wheel become aligned and progressively transfers the legs of the birds from the recesses of the bird lifting plate to the recesses of the intermediate transfer wheel.

The intermediate transfer wheel is positioned adjacent the path of the cooling line shackles and carries the birds from the cam operated modules of the bird removal assembly over to the shackles of the cooling line. The shackles of the cooling line also have a pair of spaced recesses for receiving and carrying the legs of the birds in an inverted attitude into the cooling chamber. The cooling line shackles are moved around a turnaround end of the cooling line in timed relationship with the rotation of the intermediate transfer wheel so that the pairs of recesses of both the cooling line and the intermediate transfer wheel are moved into alignment with one another to allow transfer of the birds from the recesses of the intermediate transfer wheel to the recesses of the cooling line shackles.

A rotatable, non-driven cam action transfer disk is independently mounted above the intermediate transfer wheel for guiding the birds from the recesses of the intermediate transfer wheel into the aligned recesses of the cooling line shackles. The periphery of the rotatable transfer disk extends above the recesses of the intermediate transfer wheel so as to progressively push the legs of the birds as they are carried by the intermediate transfer wheel into the recesses of the cooling line shackles, in a manner similar to that of the transfer guide bar.

The cooling line shackles are carried by the cooling line conveyor below the intermediate transfer wheel, rather than at the same level of the intermediate transfer wheel, which requires that the birds fall a short distance from the intermediate transfer wheel down into the shackles of the cooling line. Nevertheless, the recesses of the cooling line shackles still move into lateral alignment with the recesses of the intermediate wheel so that the legs of the birds can easily be shifted into the cooling line shackles.

Thus, it is an object of the present invention to provide a bird transfer apparatus for automatically transferring birds from the overhead evisceration conveyor line to the overhead cooling conveyor line of a poultry processing plant.

Another object of the present invention is to provide a bird transfer apparatus that lifts the birds from the shackles of an eviscerator line as they are carried thereby and laterally transfers them to an intermediate device, thus completely removing the birds from the eviscerator line.

Another object of the present invention is to provide a bird transfer apparatus that operates quickly and efficiently to remove birds from an eviscerator line and rehang the birds on a cooling line.

Another object of the present invention is to provide a bird transfer apparatus that is simple in design and durable in structure and which operates automatically to transfer birds from one overhead conveyor system to another.

These and other objects, features, and advantages of the present invention will become apparent from the following detailed description when read in conjunction with the accompanying drawings.

BRIEF DESCRIPTION OF THE DRAWINGS

FIG. 9 is a side elevation view of the cam operated modules shown in FIG. 1 with one module in its start position and one module in its highest lift position;

FIG. 10 is a side elevation view of the bird transfer apparatus of FIG. 1 showing the movement of the birds from the eviscerator line to the cooling line.

DETAILED DESCRIPTION

Figure 1:
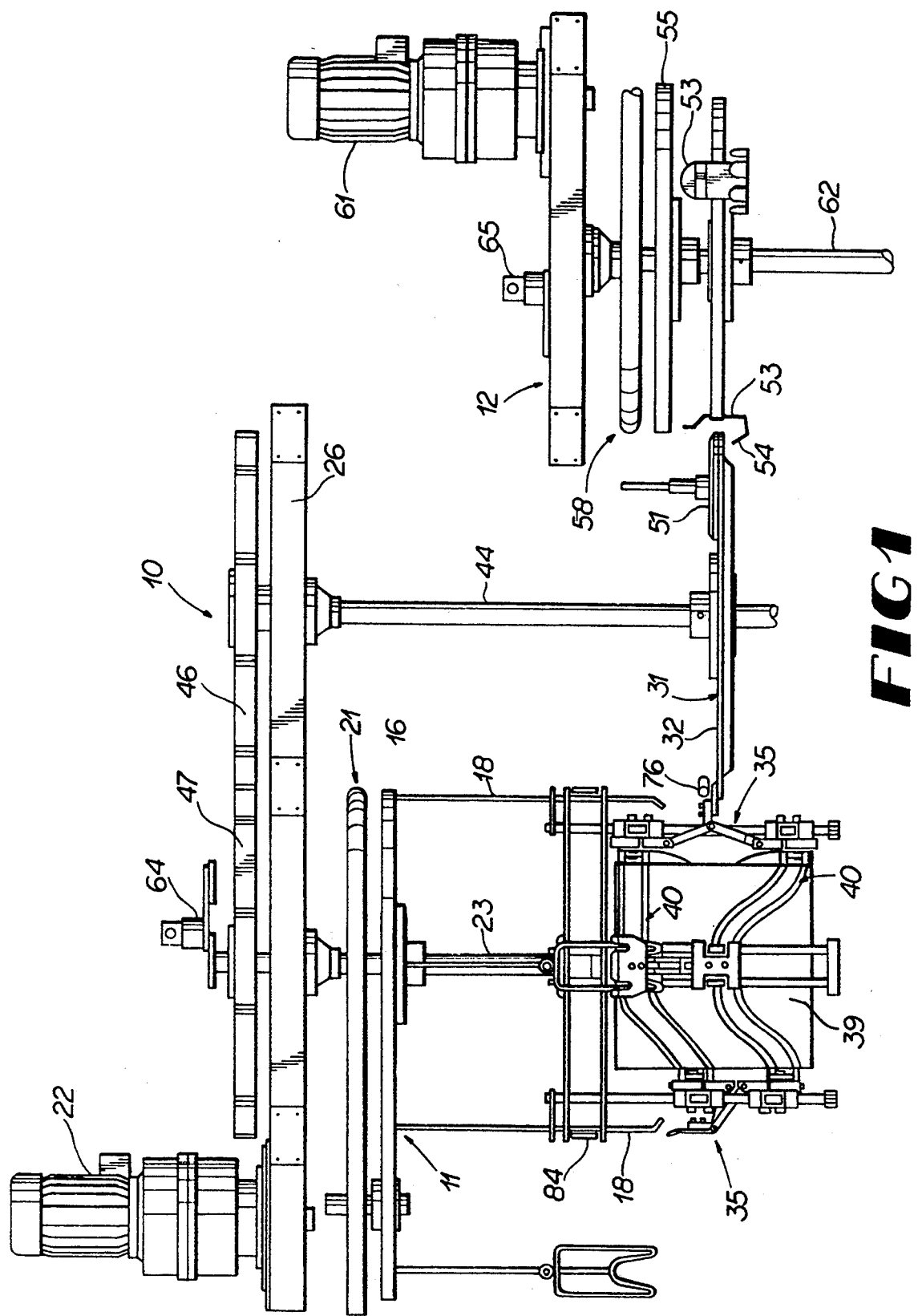
FIG. 1 is a side elevation view of the bird transfer apparatus built in accordance with a preferred embodiment of the present invention.

Referring now to the drawings, in which like numerals represent like elements throughout the several views, FIG. 1 is a side elevation view of the bird transfer apparatus 10 of the present invention. The bird transfer apparatus 10 transfers birds from the end of an evicerator line 11 to the beginning of a drip line, or cooling line 12 within a poultry processing plant. At the end of the evicerator line 11, the birds have been killed, defeathered, and eviscerated, and need to be cooled prior to being weighed and cut-up for packaging. Because the conveyor system of the cooling line utilizes shackles of different design from those of the eviscerator line, it is necessary to transfer the birds from the shackles of the evicerator line to the shackles of the cooling line.

The end of the evicerator line 11 comprises, generally, a shackle guide track and conveyor chain 16 along which bird carrying shackles 18 are intermittently suspended in a manner well known in the art. The bird carrying shackles 18 are propelled around a turnaround end 21 of the evicerator line as they carry the birds by their hocks suspended in an inverted attitude. The conveyor chain 16 of the evicerator line 11 is driven by a conventional motor, such as motor 22, coupled to a main vertical drive shaft 23 by a chain and sprocket system (not shown). An overhead frame 26 is provided for supporting the various components of the evicerator line and is itself supported either from the ceiling or above the floor of the poultry processing plant.

A bird removal assembly 29 is positioned below the turnaround end 21 of the evicerator line 11, and functions to lift the birds from the shackles 18 of the evicerator line 11 and lower them to an intermediate transfer means 31, discussed later. The bird removal assembly 29 comprises a plurality of vertically oriented cam operated modules 35, which are secured to a revolving support frame 36 comprising a pair of horizontally oriented shackle guide wheels 37. The bird removal assembly 29 also includes a stationary cam drum 39 having a cam system 40, discussed later. The shackle guide wheels 37 are mounted to the main vertical drive shaft 23 and, therefore, are driven in timed relationship with the shackles 18 of the evicerator line 11. The stationary cam drum 29 is mounted to a fixed point (not shown). As the cam operated modules 35 move around the stationary cam drum 39, they lift the birds from the shackles 18 as the birds are carried thereby and present the birds for transfer to the intermediate transfer means 31, as discussed later.

The intermediate transfer means 31 includes a transfer wheel 32 which receives the birds from the cam operated modules 35 and carries them in an inverted attitude over to the cooling line 12. The transfer wheel 32 is mounted to a secondary vertical drive shaft 44, which is rotatably driven by a pair of gears 46,47. Gear 47 is mounted atop the main vertical drive shaft 23 of the evicerator line 11 and is, thereby, driven by motor 22.

At the cooling line 12, the birds are transferred from the transfer wheel 31 by a rotatable cam action guide disc 51, which is independently secured to the frame by means not shown. The cam action disc 51 is not driven, but is rotatable in response to engagement with the hocks of the birds, as discussed later. The cooling line shackles 53 are carried by the cooling line conveyor system into close proximity to the transfer wheel 32 with the lower hock carrying portions 54 of the shackles 53 below the level of the transfer wheel 32. The cooling line shackles 53 receive the birds and carry them into the cooling chamber (not shown).

The cooling line conveyor 12 comprises a shackles guide track and chain drive 55 for propelling the cooling line shackles 53 around a turnaround end 58 of the cooling line 12. A cooling line drive motor 61 rotatably drives a vertical cooling line drive shaft 62, to which the chain drive 55 is coupled in a manner well known in the art.

A pair of encoders 64,65 are provided for sensing the speeds of the evicerator line 11 and the cooling line 12 and adjusting the speeds of motors 22 and 61 accordingly in order to ensure that both the evicerator system and the cooling system operate at the same speed.

Figure 2:
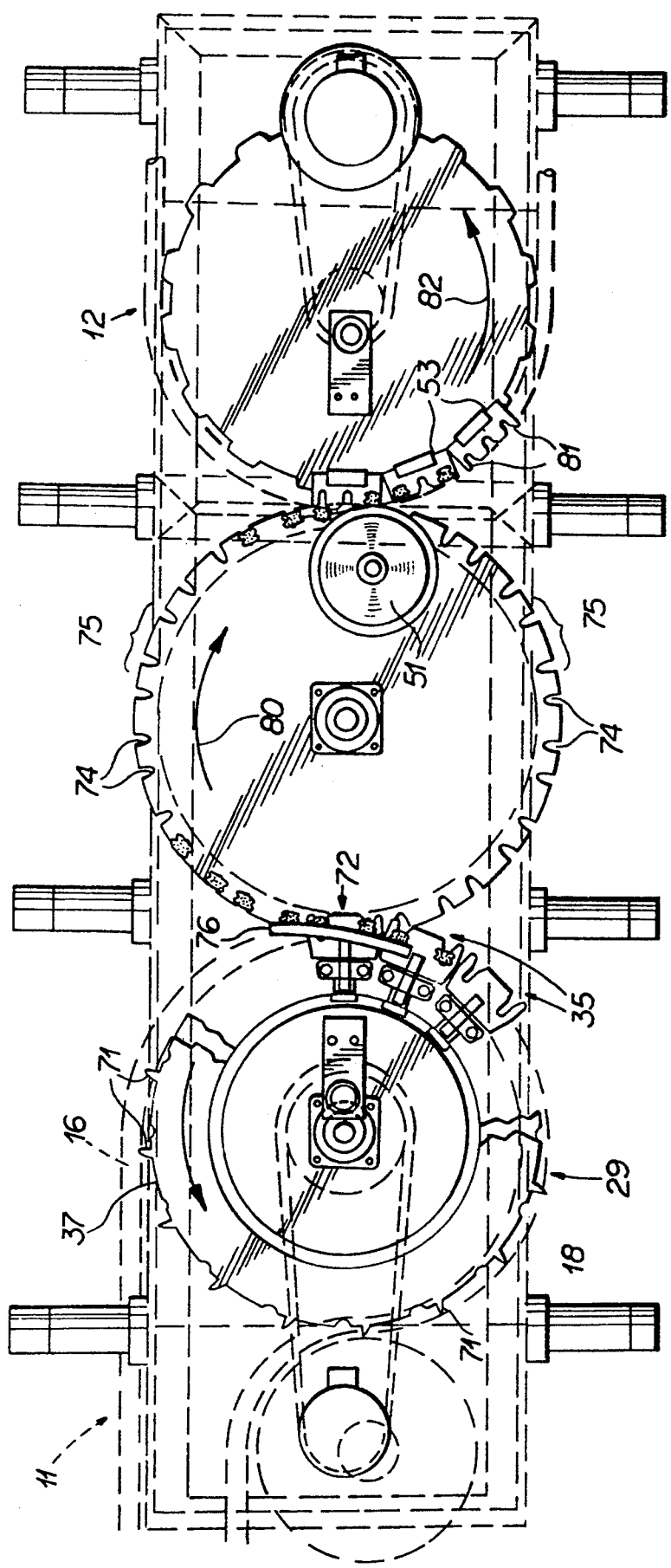
FIG. 2 is a top view of the bird transfer apparatus of FIG. 1, shown with part of the bird removal assembly partially cut-away.

FIG. 2 is a top plan view of the bird removal assembly 10. FIG. 2 shows the shackle guide track 16 of the evicerator line 11 converging with the vertical projection of the peripheral edge of the shackle guide wheels 37 at point 67 along the track and diverging from the vertical projection of the shackle guide wheels 37 at point 68. Thus, the evicerator line shackles 18, suspended from the track 16, move around the bird removal assembly 29 for approximately 270 degrees.

The shackle guide wheels 37 (only one shown) of the bird removal assembly 29 has a series of projections, or spikes 71, spaced equidistantly around the peripheral edge of the guide wheel. These spikes 71 are provided to receive therebetween the shackles 18 in order to align the shackles 18 with the cam operated modules 35 of the bird removal assembly 29.

At the intersection 72 of the path of movement of the cam operated modules 35 around the bird removal assembly and the transfer wheel 32, the birds are transferred from the cam operated modules 35 into recesses 74 along the peripheral edge of the transfer wheel 32. As will be discussed later, the birds are carried throughout the transfer process by their legs in an inverted attitude. Accordingly, the recesses of the transfer wheel 32 are arranged in pairs 75 of recesses spaced equidistance, each pair for receiving the leg of one bird.

An elongated, arcuate transfer guide bar 76 is provided at intersection 72 for engaging the legs of the birds carried by a cam operated modules 35 and pushing the legs into the recesses 74 of the transfer wheel 32. The arcuate transfer guide bar 76 is mounted at a fixed point above the transfer wheel 32, as can be seen in FIG. 1.

The rotatable cam action guide disc 51 is positioned eccentrically with respect to the transfer wheel 32 so that its peripheral edge 78 extends outwardly above the recesses 74. The peripheral edge 78 of the cam action disc 51 is upwardly angled to assist the peripheral edge in seeking the lower most portion of the hocks of the birds, which ride above the upper surface of the transfer wheel 32.

As the birds are carried by the transfer wheel 32, in the direction indicated by arrow 80, the hocks of the bird engage the peripheral edge 78 of the cam action disc 51 as the recesses 74 of the transfer wheel 32 move into alignment with the recesses 81 of the shackles 53 of the cooling line 12. As the hocks of the birds engage the cam action disc 51, they are pushed thereby laterally into the aligned recesses 81 of the cooling line shackles 53, which then carry the birds, in the direction indicated by arrow 82, into the cooling chamber.

Figure 3:
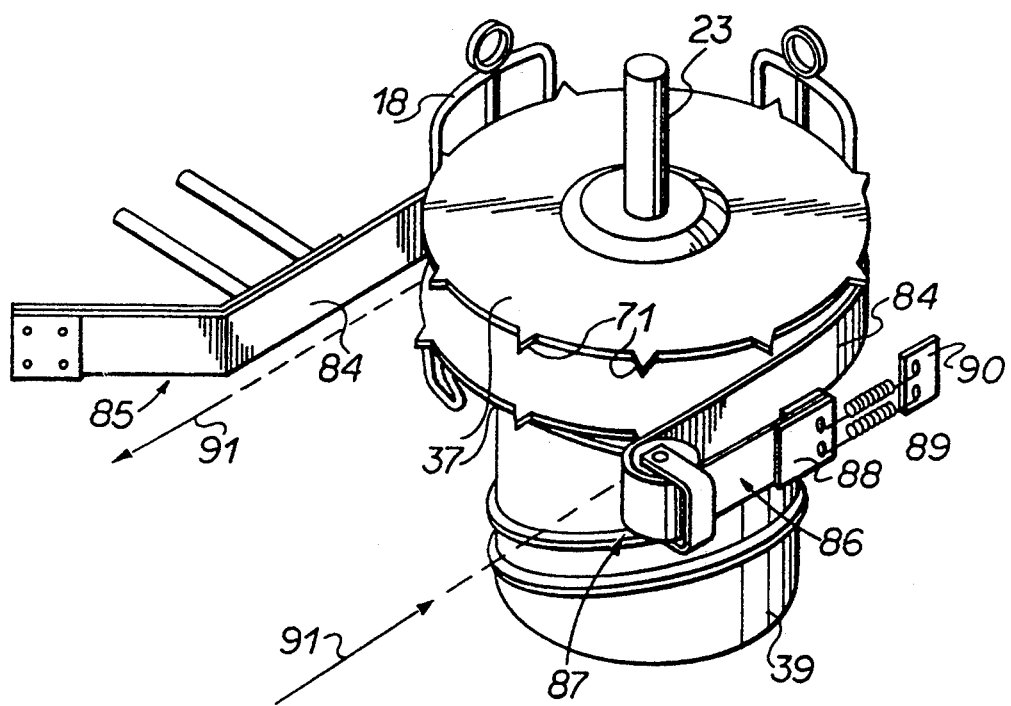
FIG. 3 is a perspective view of the tension belt and shackle guide wheels of the bird removal assembly shown in FIG. 1.

FIG. 3 is a perspective view of a tension belt 84 that is provided around the periphery of the shackle guide wheels 37. The tension belt 84 is fastened at one end 85 to a fixed point in the system (not shown). At its other end 86, the tension belt 84 stretches around a roller 87 and is secured to a clamp 88, which is tensioned by tension springs 89. The tension springs 89 are hooked to a support plate 90, which is secured to a fixed point (not shown). The tension belt 84 functions to hold the shackles 18 against the peripheral edges of the guide wheels 37 and between the spikes 71. As the shackles 18 are propelled around the guide wheels 37 in the direction of arrows 91, they are pinched between the tension belt 84 and the guide wheels 37. This arrangement provides for accurate control of the shackles while the cam operated modules of the bird removal assembly move in alignment with the shackles and lift the birds therefrom.

Figures 4, 5, 6:
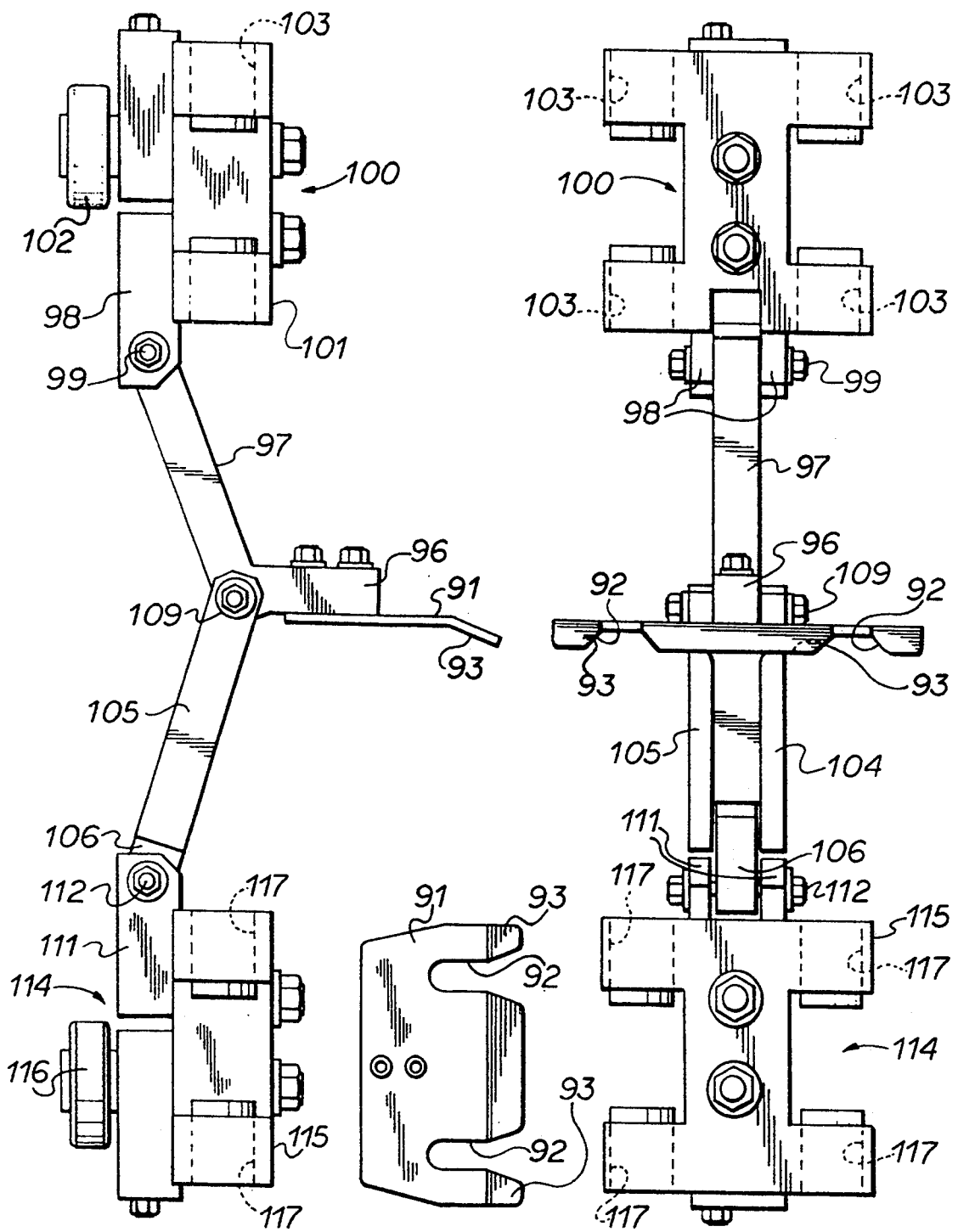
FIGS. 4 and 5 are a side elevation view and a front elevation view, respectfully, of a cam operated module shown in FIG. 1.
FIG. 6 is a plan view of the bird lifting plate of the cam operated module shown in FIG. 1.

FIGS. 4, 5 and 6 show the movable components of the cam operated modules 35. A bird lifting plate 91, or transfer plate, is provided having a pair of recesses 92 for straddling each leg of a bird. The tips 93 of the bird lifting plate are angled to assist in aligning the legs of a bird within the recesses. The bird lifting plate 91 is mounted to a bar 96, which is secured to an upper cantilever arm 97. A clevis 98 and pivot pin 99 are provided to support pivotally the upper cantilever arm 97. The clevis 98 is mounted to an upper carriage 100 comprising a guide block 101 and a cam follower roller 102, which is rotatably secured to the back side of the guide block 101. The guide block 101 has a set of bores 103 for receiving a pair of guide shafts, discussed later.

A lower cantilever arm is provided consisting of two elongated arms 104,105 and a center block 106 rigidly secured to the two elongated arms 104,105. The upper ends of the elongated arms 104,105 are pivotally secured to the upper cantilever arm 97 by pivot pin 109. The center block 106 is pivotally secured to a clevis 111 by pivot pin 112. The clevis 111 is mounted to a lower carriage 114, similar to that of upper carriage 100, and comprising a guide block 115 and a cam follower roller 116. Guide block 115 also has a set of bore holes 117.

Figure 7:
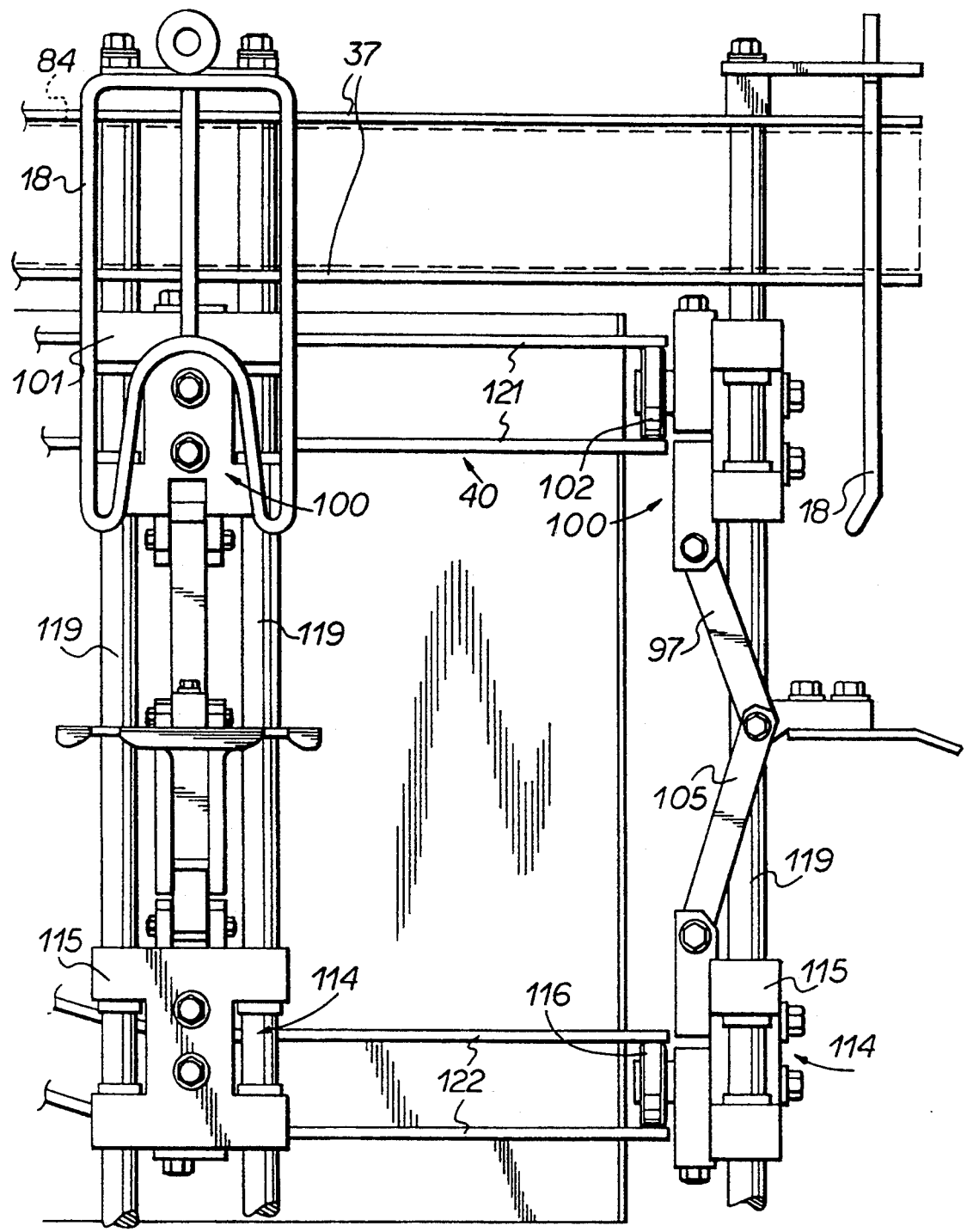
FIG. 7 is a front view of the bird removal assembly of FIG. 1 shown with the bird lifting plate in its horizontal position.

FIG. 7 shows the cam operated modules 35 in relation to the shackle guide wheels 37. The guide blocks 101 and 115 of the carriages 100 and 114 slide up and down a pair of vertical guide shafts 119, which are secured to the shackle guide wheels 37. FIG. 7 also shows in dotted lines the tension belt 84 holding the shackles 18 up against the guide wheels 37.

The cam system 40 includes a pair of cam tracks 121,122, which extend around the stationary cam drum 39. The cam follower rollers 102,116 ride along the cam tracks 121,122, respectively, as the cam operated modules 35 are rotated in unison with the shackles 18.

Figure 8:
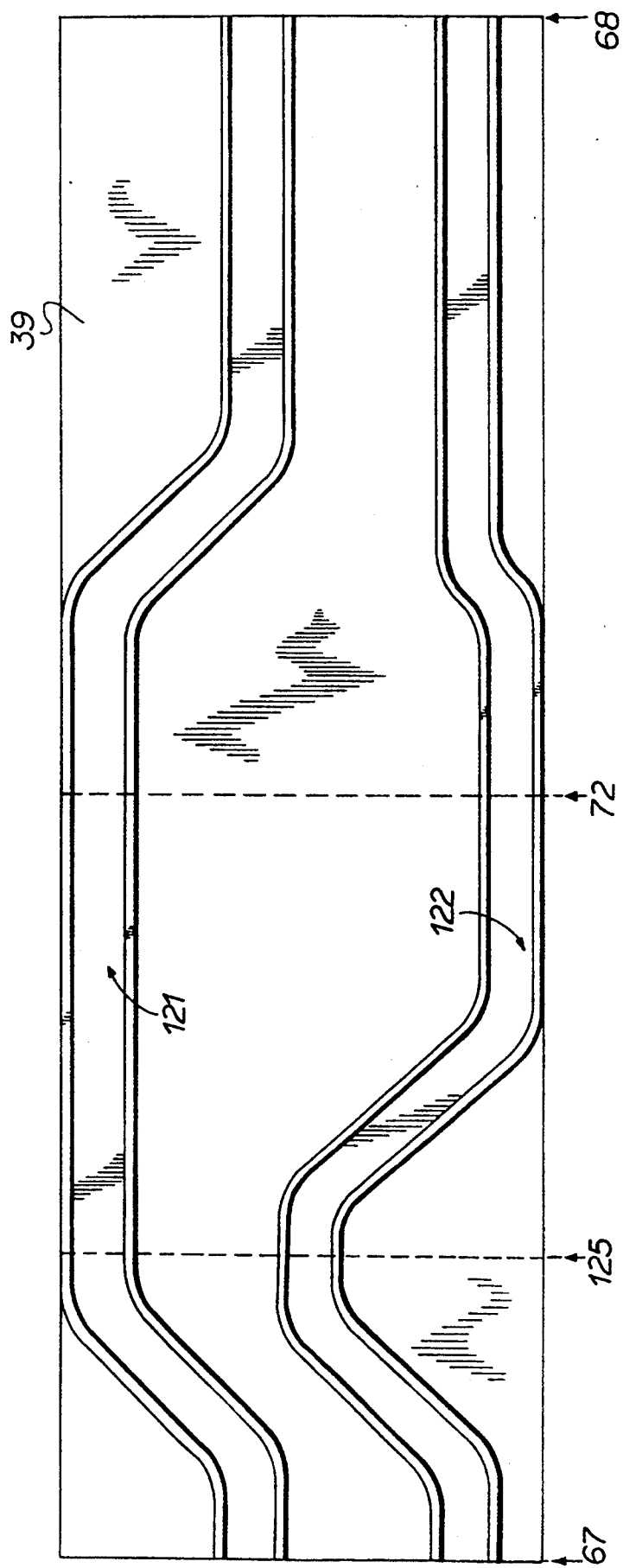
FIG. 8 is a schematic drawing of the cam drum shown in FIG. 1.

FIG. 8 is a schematic drawing of the cam tracks 121,122 as they rise and descend around the stationary cam drum 39 from the point at which the shackles meet up with the cam operated modules, depicted as point 67 (see FIG. 2), to their zenith 125, which is 90 degrees around the stationary cam drum 39 displaced from point 67, to the intersection 72 (see FIG. 2) of the cam operated modules and the transfer wheel, which occurs 180 degrees from point 67, to the point at which the shackles and the cam operated modules diverge, as depicted by numeral 68 (see FIG. 2), which is 270 degrees from point 67.

FIG. 9 shows the position of the cam operated module 35 at point 67, as illustrated in FIGS. 2 and 8, and at point 125. At point 67, the shackle 18 has converged with the cam operated module 35 and both the upper and lower carriages 100,114 are in their lower most positions. So positioned, the bird lifting plate 91 is vertical with its tips 93 pointed forward toward the bird 130, and the legs 131 of the bird are resting within the recesses (not shown) of the bird lifting plate. The breast portion 132 of the bird is up against the side of the bird lifting plate 91, and the hocks 133 of the bird are held by the shackle.

Between point 67 and point 125 of the cam system, the cam tracks 121,122 rise in unison so as to raise the bird lifting plate in a vertical motion in order to lift up on the legs of the bird. At point 125, shown in FIG. 9, the bird 130 is lifted from the shackle 18. At this point, the lower cam track 122 begins to descend and the lower carriage 114 moves downwardly away from the upper carriage 100. This relative movement of the carriages causes the cantilever arms 97 and 104–105 to pivot away from one another, which causes the bird lifting plate 91 to rotate from its vertical position downward to its horizontal position, as shown in FIG. 7. The rotation of the bird lifting plate 91 draws the legs of the bird outwardly away from the shackle and downwardly to the level of the transfer wheel. The position of the cam operated module 35 with the bird lifting plate in its horizontal position, depicted in FIG. 7, corresponds to the intersection point 72, as depicted in FIG. 8. However, this horizontal position of the bird lifting plate is achieved just prior to the cam operated module reaching the transfer wheel in order to lower the bird lifting plate to the level of the transfer wheel so as to ensure a smooth transfer of the bird from the recesses of the bird lifting plate into the recesses of the transfer wheel, which functions as a bird receiving member.

FIG. 10 illustrates the operational sequence of the transfer apparatus 10. The birds are conveyed from the eviscerator line, point A, into the guide wheel 37 and tension belt 84, point B, wherein the bird lifting plate 91 engages the birds with the legs of the birds aligned within the recesses of the bird lifting plate. The carriages 100,114 move up the cam tracks 121,122 and the bird lifting plate 91 lifts the birds from the shackles, point C. The lower carriage then begins to descend, causing the bird lifting plate to rotate outwardly away from the drum 39 and downwardly to the level of the transfer wheel 32, point D. At this juncture, the recesses of the bird lifting plate and the transfer wheel become aligned and the hocks of the birds engage the elongated transfer guide bar 76 and slide into the recesses of the transfer wheel.

The birds are then carried by the transfer wheel over to the cooling line, point E, wherein the cam action disc 51 pushes the hocks of the birds from the recesses of the transfer wheel into the recesses of the cooling line shackles 53. The cooling line shackles then carry the birds toward the cooling chamber, point F.

It should be understood that the foregoing relates only to a preferred embodiment of the present invention, and numerous changes and modifications may be made thereto without departing from the spirit and scope of the invention.

I claim:

1. A method of transferring birds from a first overhead conveyor system to a second overhead conveyor system with the birds conveyed are suspended by their legs in an inverted attitude from shackles of the first and second overhead conveyor systems, the method comprising the steps of:

as the birds are conveyed by the first overhead conveyor system, aligning the birds with a first transfer means, as the birds become aligned with the first transfer means, moving a lifting plate toward engagement with each bird, lifting the legs of each bird from its shackle of the first overhead conveyor system by raising the lifting plate including a pair of recesses into engagement with the legs of each bird so that each leg of the bird is received within a recess of the lifting plate, moving the birds supported by the lifting plates away from the first overhead conveyor system and aligning the recesses of each lifting plate with recesses of an intermediate transfer means, guiding the legs of each bird from the recesses of each lifting plate into the aligned recesses of the intermediate transfer means, and transferring each bird from the intermediate transfer means to the second overhead conveyor system.

2. The method of claim 1, and wherein the step of transferring each bird from the intermediate transfer means, comprises moving each bird with the intermediate transfer means toward the shackles of the second overhead system, aligning the recesses of the intermediate transfer means with recesses of the shackles of the second overhead conveyor system, and urging the legs of each bird from the recesses of the intermediate transfer means onto the shackles of the second overhead conveyor system.

3. The method of claim 1, wherein the step of lifting the legs of each bird comprises raising the lifting plate with its recesses in an upwardly facing attitude and the step of aligning the recesses of each lifting plate with the recesses of the intermediate transfer means comprises tilting the lifting plate to position its recesses in a horizontally aligned attitude in alignment with the recesses of the intermediate transfer means so that the legs of each bird can be guided from the lifting plate to the intermediate transfer means.

4. The method of claim 2, wherein the step of raising the lifting plate with its recesses in an upwardly facing attitude comprises raising the lifting plate along a vertical path laterally displaced from the shackle so as to lift the legs of the bird both upwardly and away from the shackle in order to lift the bird completely off the shackle.

5. The method of claim 1, wherein the step of guiding the legs of each bird from the recesses of the lifting plate into the aligned recesses of the intermediate transfer means comprises moving the lifting plate past a guide member positioned angularly across the path of movement of the lifting plate so as to push progressively the legs of the bird as they move past the guide member from the recesses of the lifting plate into the recesses of the intermediate transfer means.

6. The method of claim 1, wherein the step of lifting the legs of each bird from its shackle of the first overhead conveyor system comprises aligning the shackles of the birds with a series of transfer modules for lifting the birds from the shackles and transferring them to the intermediate conveyor.

7. An apparatus for transferring birds from an overhead conveyor system to a secondary conveyor system, wherein the birds are carried along a processing path in an inverted attitude suspended by their legs from shackles of the overhead conveyor system and the secondary conveyor system, the apparatus comprising:

a support frame, means for rotating said support frame about a vertical axis in response to the movement of the overhead conveyor, a series of transfer modules on carried said support frame and adapted to rotate about said support frame so as to move adjacent the processing path in timed relationship with the movement of the birds on the overhead conveyor line, each transfer module including a bird lifting plate having recesses formed therein for receiving the legs of a bird, said bird lifting plates adapted to move upwardly and downwardly on said support frame and and tilt from a vertical lifting position toward a horizontal transfer position as said lifting plates are rotated about said support frame, cam means on the support frame for moving each transfer module and its bird lifting plate upwardly and downwardly and for tilting said bird lifting plate of each transfer module from an upwardly extended bird lifting position adapted to engage and lift the birds from the shackles of the overhead conveyor line, toward a substantially horizontal bird transfer position as each transfer module moves along the processing path, and guide means mounted adjacent the processing path for engaging the legs of the birds when said bird lifting plates are in their horizontally extending bird transfer positions and for guiding the legs of the birds from said bird lifting plates onto a transport means for transferring the birds to a support means of the secondary conveyor.

8. The apparatus of claim 7, wherein each transfer module comprises a vertically aligned guide shaft, first and second guide blocks slidable along the guide shaft, a first cantilever arm pivotally mounted at one of its ends to the first guide block, and a second cantilever arm pivotally mounted at one of its ends to the second guide block, said first and second cantilever arms pivotally mounted together at their opposite ends with said bird lifting plates mounted to said first cantilever arms such that, as said guide blocks move in close proximity to one another, each bird lifting plate moves toward its vertical lifting position and, as said guide blocks become spaced apart, each bird lifting plate moves toward its horizontal transfer position, whereby, as each bird lifting plate is moved upwards toward its vertical lifting position by each transfer module, said recesses of said bird lifting plates engage the legs of the birds and lift the birds from their shackles.

9. A method of transferring a bird being carried in an inverted attitude suspended from a shackle of a first overhead conveyor system from the first conveyor system to another conveyor system comprising:

tilting a transfer plate having notches formed along one edge thereof so that the notches face upwardly, with the transfer plate in its upturned attitude moving the transfer plate upwardly between the bird and the shackle, engaging the legs of the bird with the notches of the transfer plate as the transfer plate is moved upwardly and lifting the legs out of the shackles, moving the transfer plate in timed relationship with the movement of a bird receiving member having notches formed circumferentially therealong to align the notches of the bird receiving member with the notches of the transfer plate, tilting the transfer plate toward a substantially horizontal attitude with the notches of the bird receiving member and the notches of the transfer plate becoming substantially aligned and at the same time moving the transfer plate toward the bird receiving member with the legs of the bird being received within the notches of the bird receiving member transferring the bird from the transfer plate to the bird receiving member, and transferring the birds from the bird receiving member to the shackles of the other conveyor system.

10. The method of claim 9, and further comprising the steps of transferring the bird to shackles of the other conveyor system, comprising aligning the notches of the bird receiving member with the shackles of the other conveyor system, and guiding the legs of the bird from the notches of the bird receiving member into the shackles of the other conveyor system.

* * * * *